(12) United States Patent
He et al.

(10) Patent No.: US 11,249,540 B2
(45) Date of Patent: Feb. 15, 2022

(54) SYSTEM AND METHOD OF CONFIGURING POWER CONSUMPTION OF A PROCESSOR AND A GRAPHICS PROCESSING UNIT

(71) Applicant: Dell Products L.P., Round Rock, TX (US)

(72) Inventors: Qinghong He, Austin, TX (US); Travis Christian North, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 27 days.

(21) Appl. No.: 16/929,601

(22) Filed: Jul. 15, 2020

(65) Prior Publication Data

US 2022/0019279 A1 Jan. 20, 2022

(51) Int. Cl.
| | |
|---|---|
| *G06F 1/3287* | (2019.01) |
| *G06F 1/20* | (2006.01) |
| *G06F 1/3296* | (2019.01) |
| *G06F 1/3203* | (2019.01) |

(52) U.S. Cl.
CPC ............ *G06F 1/3287* (2013.01); *G06F 1/206* (2013.01); *G06F 1/3203* (2013.01); *G06F 1/3296* (2013.01)

(58) Field of Classification Search
CPC ...... G06F 1/3287; G06F 1/3203; G06F 1/206; G06F 1/3296; G06F 1/3206
See application file for complete search history.

(56) References Cited

U.S. PATENT DOCUMENTS

| | | | | |
|---|---|---|---|---|
| 2014/0143565 A1* | 5/2014 | Paul | ........................ | G06F 1/206 |
| | | | | 713/320 |
| 2014/0181539 A1* | 6/2014 | Lin | ........................ | G06F 1/3275 |
| | | | | 713/300 |
| 2016/0098334 A1* | 4/2016 | Hariharakrishnan | ........................ | |
| | | | | G06F 11/3428 |
| | | | | 702/186 |
| 2017/0031430 A1* | 2/2017 | Ansorregui | ........... | G06F 1/3206 |
| 2018/0157315 A1* | 6/2018 | Ehsan | .................... | G06F 1/3206 |
| 2018/0210530 A1* | 7/2018 | Kwon | ........................ | G06T 1/20 |
| 2021/0157383 A1* | 5/2021 | Hsu | ........................ | G06F 1/3228 |

OTHER PUBLICATIONS

Henry Wong et al., "Demystifying GPU microarchitecture through microbenchmarking," *2010 IEEE International Symposium on Performance Analysis of Systems & Software (ISPASS)*, White Plains, NY, 2010, pp. 235-246, doi: 10.1109/ISPASS.2010.5452013.

* cited by examiner

*Primary Examiner* — Jaweed A Abbaszadeh
*Assistant Examiner* — Gayathri Sampath
(74) *Attorney, Agent, or Firm* — Baker Botts L.L.P.

(57) ABSTRACT

In one or more embodiments, one or more systems, one or more methods, and/or one or more processes: may determine a first amount of power consumed by a processor of an information handling system; may configure power consumed by the processor to a second amount of power, lower than the first amount of power; may determine a first performance value based at least on a first change of frames per second and a first change of temperature; may determine a second performance value based at least on a second change of frames per second and a second change of temperature; may determine that the second performance value is greater than the first performance value; may configure power consumed by the processor to the second amount of power; and may configure power consumed by the a graphics processing unit of the information handling system to a third amount of power.

20 Claims, 8 Drawing Sheets

SYSTEM AND METHOD OF CONFIGURING POWER CONSUMPTION OF A PROCESSOR AND A GRAPHICS PROCESSING UNIT

BACKGROUND

Field of the Disclosure

This disclosure relates generally to information handling systems and more particularly to configuring power consumptions of processors and graphics processing units of information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may determine a first temperature value associated with an information handling system; may determine a first number of frames per second (FPS) produced by a graphics processing unit (GPU) of the information handling system; may determine a first amount of power consumed by a processor of the information handling system; may configure power consumed by the processor to a third amount of power, lower than the first amount of power; may permit a first amount of time to transpire; may determine a second temperature value associated with the information handling system; may determine a second number of FPS produced by the GPU; may determine a first performance value based at least on a first change of FPS and a first change of temperature; may permit a second amount of time to transpire; may determine a third temperature value associated with the information handling system; may determine a third number of FPS produced by the GPU; may determine a second performance value based at least on a second change of FPS and a second change of temperature; may determine that the second performance value is greater than the first performance value; may configure power consumed by the processor to the third amount of power; and may configure power consumed by the GPU to the second amount of power.

In one or more embodiments, a semiconductor package of the information handling system may include the processor and the GPU. In one or more embodiments, the first change of temperature may include a difference between the first temperature value and the second temperature value; the second change of temperature may include a difference between the second temperature value and the third temperature value; the first change of FPS may include a difference between the first number of FPS and the second number of FPS; and the second change of FPS may include a difference between the second number of FPS and the third number of FPS. For example, the first performance value may include a first quotient of the first change of FPS and the first change of temperature, and the second performance value may include a second quotient of the first change of FPS and the second change of temperature.

In one or more embodiments, the information handling system may include a housing. For example, the first temperature value associated with the information handling system may include a first temperature value associated with an outer surface of the housing of the information handling system; the second temperature value associated with the information handling system may include a second temperature value associated with the outer surface of the housing of the information handling system; and the third temperature value associated with the information handling system may include a third temperature value associated with the outer surface of the housing of the information handling system.

In one or more embodiments, the one or more systems, the one or more methods, and/or the one or more processes may further, before determining the first number of FPS, determine that the first temperature value associated with the information handling system meets or exceeds a threshold temperature value. For example, determining the first number of FPS may be performed in response to determining that the first temperature value associated with the information handling system meets or exceeds the threshold temperature value. In one or more embodiments, the first temperature value associated with the information handling system may include a first temperature value associated with a portion of an outer surface of the housing of the information handling system.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1A:
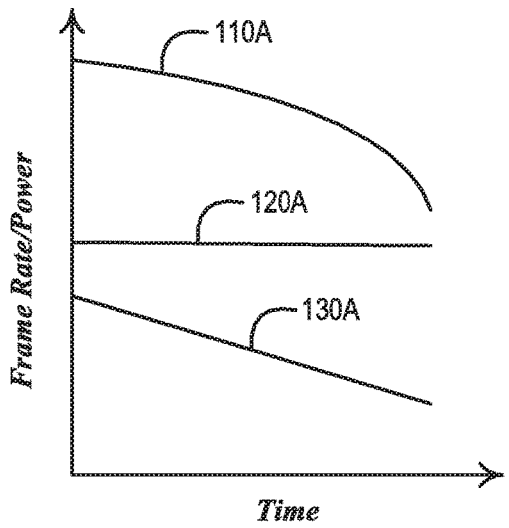
FIG. 1A illustrates an example of frames per second being reduced as power consumed by a processor of an information handling system is reduced, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, an information handling system may include a processor and a graphics processing unit (GPU), and simultaneous utilization of the processor at its maximum design power and of the GPU at its maximum design power may not be possible. For example, the information handling system may be a portable information handling system (e.g., configured to be readily carried by a user). In one instance, a power supply that provides power to the information handling system may not provide enough power to simultaneously utilize both the processor at its maximum design power and the GPU at its maximum design power. In a second instance, a battery that provides power to the information handling system may not provide enough power to simultaneously utilize both the processor at its maximum design power and the GPU at its maximum design power. In another instance, a maximum skin temperature of the information handling system may not be exceeded, which may not permit simultaneous utilization of both the processor at its maximum design power and the GPU at its maximum design power.

In one or more embodiments, a skin temperature value of the information handling system may include a temperature value associated with a portion of an outer surface of a housing of the information handling system. In one example, the outer surface of the housing may include a case that houses the information handling system. In one instance, the case may include a material that includes metal. In another instance, the case may include a material that includes plastic. In another example, the outer surface of the housing may include a keyboard. For instance, the keyboard may form a portion of the housing.

In one or more embodiments, maintaining a skin temperature value of the information handling system below a threshold temperature value may include reducing a power utilized by a processor of the information handling system and/or reducing a power utilized by a GPU of the information handling system. Based at least on a reduction of power utilized by the processor, graphics displayed to a user may degrade. For example, a number of frames per second (FPS) (e.g., a number of images generated each second) produced by the information handling system may degrade as power utilized by the processor is reduced. For instance, as illustrated in FIG. 1A, a number of FPS 110A produced by the information handling system may degrade as power 130A utilized by the processor is reduced. As shown in FIG. 1A, power 120A utilized by the GPU may not be reduced.

Figure 1B:
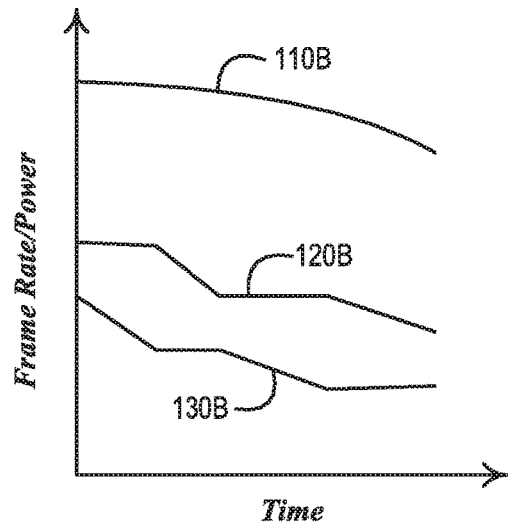
FIG. 1B illustrates another example of frames per second being reduced as power consumed by a graphics processing unit of an information handling system is reduced and as power consumed by a processor of the information handling system is reduced, according to one or more embodiments.

Based at least on a reduction of power utilized by the processor and based at least on a power reduction of power utilized by the GPU, graphics displayed to the user may degrade, but, for example, the graphics displayed to the user may degrade as much as if a reduction of power was only applied to the processor. For instance, as illustrated in FIG. 1B, a number of FPS 110B produced by the information handling system may degrade less than the number of FPS 110A (FIG. 1A) as power 120B utilized by the GPU is reduced and as power 130B utilized by the processor is reduced at one or more times. An optimal number of FPS, based at least on a skin temperature threshold value, may be achieved by determining a power configuration of the GPU and by determining a power configuration of the processor, according to one or more embodiments. While a number of FPS produced by the information handling system is utilized in this example, other optimal values associated with displaying graphics to the user may be achieved, according to one or more embodiments. For example, the other optimal values associated with displaying graphics to the user may include an optimal refresh rate (e.g., a number of times a display updates per second) and an optimal resolution (e.g., a number of pixel columns and a number of pixel rows in a displayed image), among others. In one or more embodiments, some applications may utilize the processor more than the GPU, and other applications may utilize the GPU more than the processor. Determining a reduction in power utilized by the processor and a reduction in power utilized by the GPU may provide better graphics displayed to the user.

Figure 2:
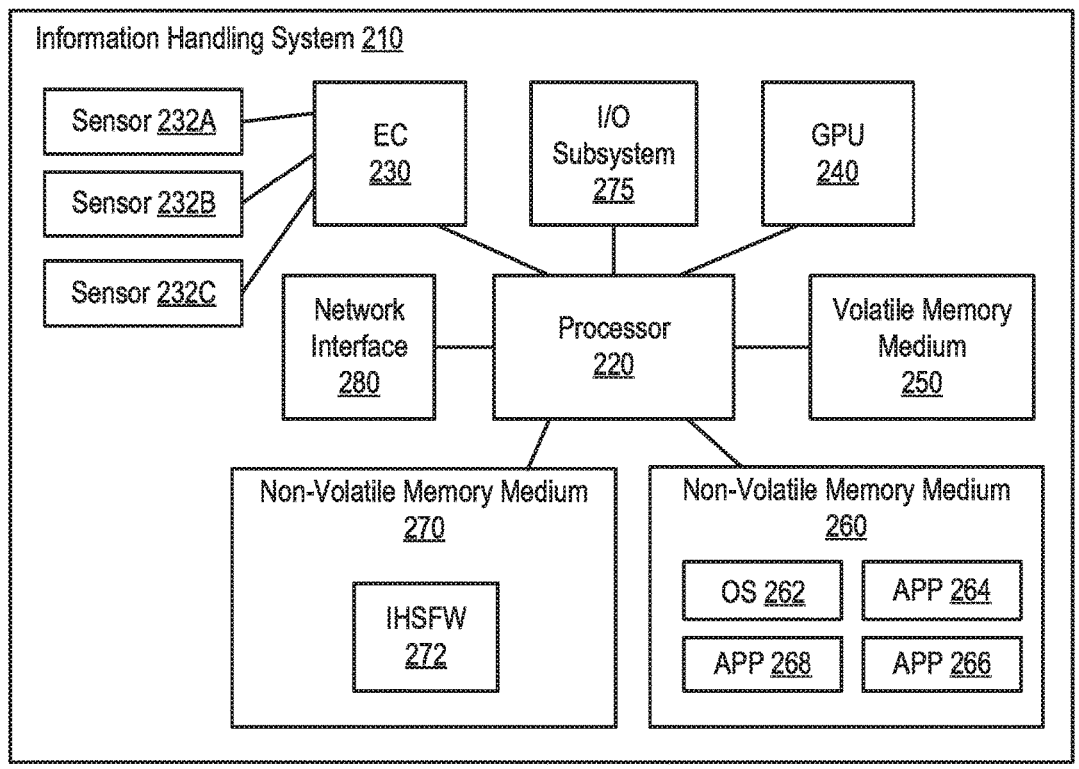
FIG. 2 illustrates an example of an information handling system, according to one or more embodiments.

Turning now to FIG. 2, an example of an information handling system is illustrated, according to one or more embodiments. An information handling system (IHS) 210 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 210 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 210 may include or have a form factor of that of or similar to one or more of a laptop, a notebook, a telephone, a tablet, and a PDA, among others. For example, a portable IHS 210 may be readily carried and/or transported by a user (e.g., a person). In one or more embodiments, components of IHS 210 may include one or more storage devices, one or more communications ports for communicating with external devices as well as various input and output (I/O) devices, such as a keyboard, a mouse, and a video display, among others. In one or more embodiments, IHS 210 may include one or more buses operable to transmit communication between or among two or more hardware components. In one example, a bus of IHS 210 may include one or more of a memory bus, a peripheral bus, and a local bus, among others. In another example, a bus of IHS 210 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 210 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 210 may include a processor 220, an embedded controller (EC) 230, a GPU 240, a volatile memory medium 250, non-volatile memory media 260 and 270, an I/O subsystem 275, and a network interface 280. As illustrated, volatile memory medium 250, non-volatile memory media 260 and 270, I/O subsystem 275, and network interface 280 may be communicatively coupled to processor 220.

In one or more embodiments, one or more of EC 230, GPU 240, volatile memory medium 250, non-volatile memory media 260 and 270, I/O subsystem 275, and network interface 280 may be communicatively coupled to processor 220 via one or more buses, one or more switches, and/or one or more root complexes, among others. In one example, one or more of EC 230, GPU 240, volatile memory medium 250, non-volatile memory media 260 and 270, I/O subsystem 275, and network interface 280 may be communicatively coupled to processor 220 via one or more PCI-Express (PCIe) root complexes. In another example, one or more of EC 230, GPU 240, I/O subsystem 275 and network interface 280 may be communicatively coupled to processor 220 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 250 may include volatile storage such as, for example, RAM, DRAM (dynamic RAM), EDO RAM (extended data out RAM), SRAM (static RAM), etc. One or more of non-volatile memory media 260 and 270 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 280 may be utilized in communicating with one or more networks and/or one or more other information handling systems. In one example, network interface 280 may enable IHS 210 to communicate via a network utilizing a suitable transmission protocol and/or standard. In a second example, network interface 280 may be coupled to a wired network. In a third example, network interface 280 may be coupled to an optical network. In another example, network interface 280 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 280 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (i SCSI), or any combination thereof, among others.

In one or more embodiments, processor 220 may execute processor instructions in implementing at least a portion of one or more systems, at least a portion of one or more flowcharts, at least a portion of one or more methods, and/or at least a portion of one or more processes described herein. In one example, processor 220 may execute processor instructions from one or more of memory media 250, 260, and 270 in implementing at least a portion of one or more systems, at least a portion of one or more flowcharts, at least a portion of one or more methods, and/or at least a portion of one or more processes described herein. In another example, processor 220 may execute processor instructions via network interface 280 in implementing at least a portion of one or more systems, at least a portion of one or more flowcharts, at least a portion of one or more methods, and/or at least a portion of one or more processes described herein.

In one or more embodiments, processor 220 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 220 may interpret and/or execute program instructions and/or process data stored locally (e.g., via memory media 250, 260, and 270 and/or another component of IHS 210). In another example, processor 220 may interpret and/or execute program instructions and/or process data stored remotely (e.g., via a network storage resource).

In one or more embodiments, I/O subsystem 275 may represent a variety of communication interfaces, graphics interfaces, video interfaces, user input interfaces, and/or peripheral interfaces, among others. For example, I/O subsystem 275 may include one or more of a touch panel and a display adapter, among others. For instance, a touch panel may include circuitry that enables touch functionality in conjunction with a display that is driven by a display adapter.

As shown, non-volatile memory medium 260 may include an operating system (OS) 262, and applications (APPs) 264-268. In one or more embodiments, one or more of OS 262 and APPs 264-268 may include processor instructions executable by processor 220. In one example, processor 220 may execute processor instructions of one or more of OS 262 and APPs 264-268 via non-volatile memory medium 260. In another example, one or more portions of the processor instructions of the one or more of OS 262 and APPs 264-268 may be transferred to volatile memory medium 250, and processor 220 may execute the one or more portions of the processor instructions of the one or more of OS 262 and APPs 264-268 via volatile memory medium 250.

As illustrated, non-volatile memory medium 270 may include information handling system firmware (IHSFW) 272. In one or more embodiments, IHSFW 272 may include processor instructions executable by processor 220. For example, IHSFW 272 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 220 may execute processor instructions of IHSFW 272 via non-volatile memory medium 270. In another instance, one or more portions of the processor instructions of IHSFW 272 may be transferred to volatile memory medium 250, and processor 220 may execute the one or more portions of the processor instructions of IHSFW 272 via volatile memory medium 250.

In one or more embodiments, OS 262 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 210) may provide information and/or notifications, among others. In one instance, the management information exchange may be or include a Windows Management Interface (WMI) for ACPI (available from Microsoft Corporation). In another instance, the management information exchange may be or include a Common Information Model (CIM) (available via the Distributed Management Task Force). In one or more embodiments, the management information exchange may include a combination of the WMI and the CIM. For example, WMI may be and/or may be utilized as an interface to the CIM. For instance, the WMI may be utilized to provide and/or send CIM object information to OS 262.

In one or more embodiments, processor 220 and one or more components of IHS 210 may be included in a system-on-chip (SoC). For example, the SoC may include processor 220 and a platform controller hub (not specifically illustrated). In one or more embodiments, a semiconductor package of IHS 220 may include processor 220 and GPU 240. In one example, the semiconductor package may include a plastic package that includes processor 220 and GPU 240. In another example, the semiconductor package may include a ceramic package that includes processor 220 and GPU 240. In one or more embodiments, a first semiconductor package of IHS 210 may include processor 220, and a second semiconductor package of IHS 210, different from the first semiconductor package, may include GPU 240.

In one or more embodiments, EC 230 may be or include a remote access controller. For example, the remote access controller may be or include a DELL™ Remote Access Controller (DRAC). In one or more embodiments, a remote access controller may be integrated into IHS 210. For example, the remote access controller may be or include an integrated DELL™ Remote Access Controller (iDRAC). In one or more embodiments, a remote access controller may include one or more of a processor, a memory, and a network interface, among others. In one or more embodiments, a remote access controller may access one or more busses and/or one or more portions of IHS 210. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. In one example, the remote access controller may be based at least on an Intelligent Platform Management Interface (IPMI) standard. For instance, the remote access controller may allow and/or permit utilization of IPMI out-of-band interfaces such as IPMI Over LAN (local area network). In another example, the remote access controller may be based at least on a Redfish standard. In one instance, one or more portions of the remote access controller may be compliant with one or more portions of a Redfish standard. In another instance, one or more portions of the remote access controller may implement one or more portions of a Redfish standard. In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, a remote access controller may be, include, or form at least a portion of a virtual KVM (keyboard, video, and mouse) device. For example, a remote access controller may be, include, or form at least a portion of a KVM over IP (IPKVM) device. For instance, a remote access controller may capture video, keyboard, and/or mouse signals; may convert the signals into packets; and may provide the packets to a remote console application via a network.

In one or more embodiments, EC 230 may be or include a microcontroller. For example, the microcontroller may be or include one or more of a Microchip Technology Incorporated MEC5105, an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, EC 230 may be or include an application processor. In one example, EC 230 may be or include an ARM Cortex-A processor. In another example, EC 230 may be or include an Intel Atom processor. In one or more embodiments, EC 230 may be or include one or more of a field programmable gate array (FPGA) and an ASIC, among others, configured, coded, and/or encoded with instructions in accordance with at least a portion of one or more of systems, at least a portion of one or more flowcharts, at least a portion of one or more methods, and/or at least a portion of one or more processes described herein.

As illustrated, IHS 210 may include sensors 232A-232C. As shown, sensors 232A-232C may be coupled to EC 230. In one or more embodiments, sensors 232 may be physically located at different physical locations within IHS 210. For example, a sensor 232 may include a temperature sensor. For instance, a temperature value may be determined at or near (e.g., within 1 mm to 15 mm) a location of a sensor 232. In one or more embodiments, a temperature sensor may include one or more of a diode, a thermistor, and an infrared (IR) sensor, among others. In one example, a temperature sensor may provide a digital temperature value to EC 230. In another example, an analog to digital converter (ADC) may receive an analog signal from a temperature sensor, and the ADC may convert the analog signal to digital data. In one instance, the digital data may include a temperature value. In another instance, EC 230 may convert and/or transform the digital data into a temperature value. In one or more embodiments, EC 230 may include the ADC. In one or more embodiments, a skin temperature of IHS 210 may be determined utilizing a sensor 232. In one example, determining the skin temperature may include utilizing a lookup table that may provide the skin temperature based at least on a temperature value determined via a sensor 232. In another example, determining the skin temperature may include computing the skin temperature based at least on a temperature value determined via a sensor 232.

Figure 3:
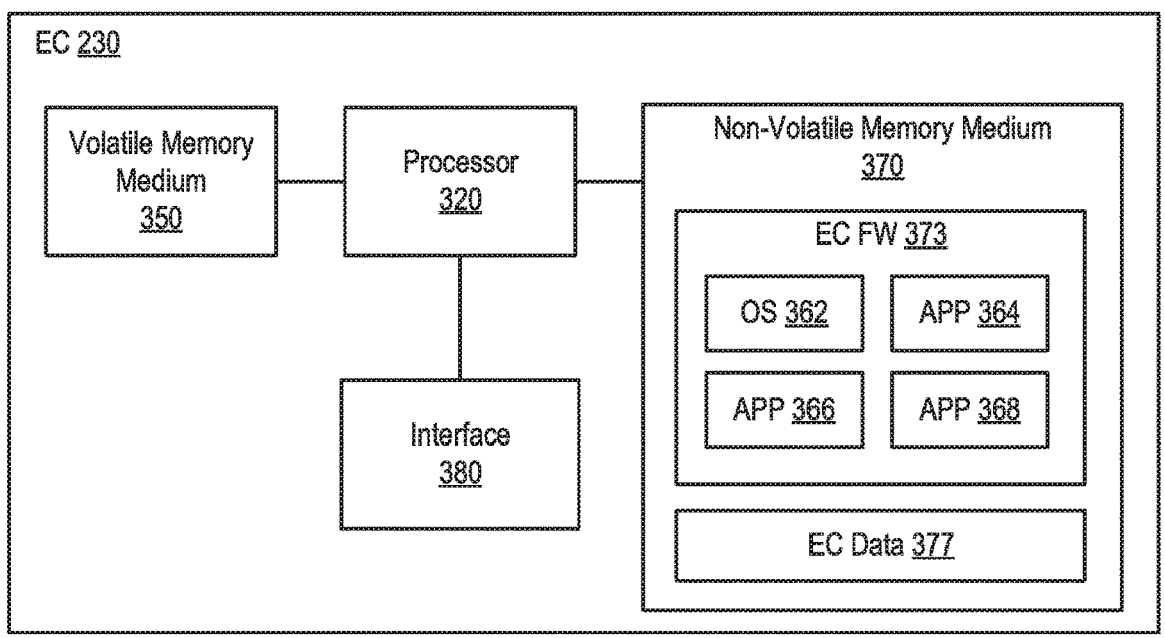
FIG. 3 illustrates an example of an embedded controller, according to one or more embodiments

Turning now to FIG. 3, an example of an embedded controller is illustrated, according to one or more embodiments. As shown, EC 230 may include a processor 320, a volatile memory medium 350, a non-volatile memory medium 370, and an interface 380. As illustrated, non-volatile memory medium 370 may include a EC firmware (FW) 373, which may include an OS 362 and APPs 364-368, and may include EC data 377. In one example, OS 362 may be or include a real-time operating system (RTOS). For instance, the RTOS may be or include FreeRTOS, OpenRTOS, SafeRTOS, QNX, ThreadX, VxWorks, NuttX, TI-RTOS, eCos, MicroC/OS, or Zephyr, among others. In a second example, OS 362 may be or include an Unix-like operating system. For instance, the Unix-like operating system may be or include LINUX®, FREEBSD®, NETBSD®, OpenBSD, Minix, Xinu, or Darwin, among others. In another example, OS 362 may be or include a portable operating system interface (POSIX) compliant operating system.

In one or more embodiments, interface 380 may include circuitry that enables communicatively coupling to one or more devices. In one example, interface 380 may include circuitry that enables communicatively coupling to one or more buses. For instance, the one or more buses may include one or more buses described herein, among others. In a second example, interface 380 may include circuitry that enables one or more interrupt signals to be received. In one instance, interface 380 may include general purpose input/output (GPIO) circuitry, and the GPIO circuitry may enable one or more interrupt signals to be received and/or provided via at least one interrupt line. In another instance, interface 380 may include GPIO circuitry that may enable EC 230 to provide and/or receive signals associated with other circuitry (e.g., diagnostic circuitry, etc.). In a third example, interface 380 may include circuitry that enables communicatively coupling to one or more networks. In one instance, interface 380 may include circuitry that enables communicatively coupling to network interface 280. In a fourth example, one or more of sensors 232A-32C may be coupled to interface 380. In another example, interface 380 may include a network interface.

In one or more embodiments, one or more of OS 362 and APPs 364-368 may include processor instructions executable by processor 320. In one example, processor 320 may execute processor instructions of one or more of OS 362 and APPs 364-368 via non-volatile memory medium 370. In another example, one or more portions of the processor instructions of the one or more of OS 362 and APPs 364-368 may be transferred to volatile memory medium 350, and processor 320 may execute the one or more portions of the processor instructions of the one or more of OS 362 and APPs 364-368 via volatile memory medium 350. In one or more embodiments, processor 320 may execute instructions in accordance with at least a portion of one or more systems, at least a portion of one or more flowcharts, one or more methods, and/or at least a portion of one or more processes described herein. For example, non-volatile memory medium 370 and/or volatile memory medium 350 may store instructions that may be executable in accordance with at least a portion of one or more systems, at least a portion of one or more flowcharts, at least a portion of one or more methods, and/or at least a portion of one or more processes described herein. In one or more embodiments, processor 320 may execute instructions in accordance with at least a portion of one or more of systems, flowcharts, at least a portion of one or more methods, and/or at least a portion of one or more processes described herein. For example, non-volatile memory medium 370 and/or volatile memory medium 350 may store instructions that may be executable in accordance with at least a portion of one or more of systems, at least a portion of one or more flowcharts, at least a portion of one or more methods, and/or at least a portion of one or more processes described herein. In one or more embodiments, processor 320 may utilize EC data 377. In one example, processor 320 may utilize EC data 377 via non-volatile memory medium 370. In another example, one or more portions of EC data 377 may be transferred to volatile memory medium 350, and processor 320 may utilize EC data 377 via volatile memory medium 350.

Figure 4A:
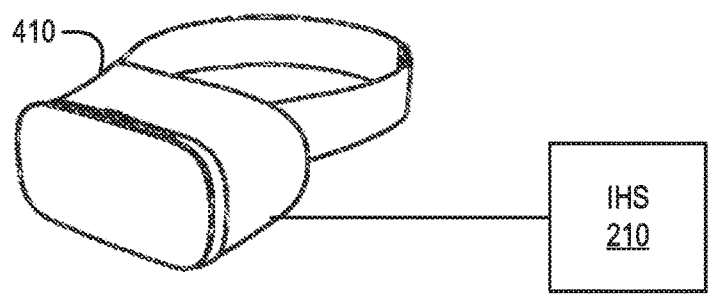
FIG. 4A illustrates an example of a display device coupled to an information handling system, according to one or more embodiments.
Figure 4B:
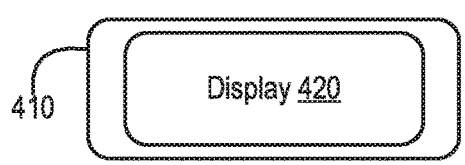
FIG. 4B illustrates an example of a display device that includes a single display, according to one or more embodiment.
Figure 4C:
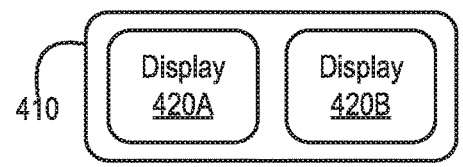
FIG. 4C illustrates an example of a display device that includes multiple displays, according to one or more embodiment.

Turning now to FIG. 4A, an example of a display device coupled to an information handling system is illustrated, according to one or more embodiments. As shown, a display device 410 may be coupled to IHS 210. In one or more embodiments, display device 410 may be configured to be worn by a user. For example, display device 410 may be configured to be worn on a head of the user to provide a virtual reality (VR) environment and/or a VR experience. In one or more embodiments, display device 410 may one or more displays. In one example, display device 410 may include a display 420, as illustrated in FIG. 4B. In another example, display device 410 may include displays 420A and 420B, as shown in FIG. 4C.

Figure 5A:
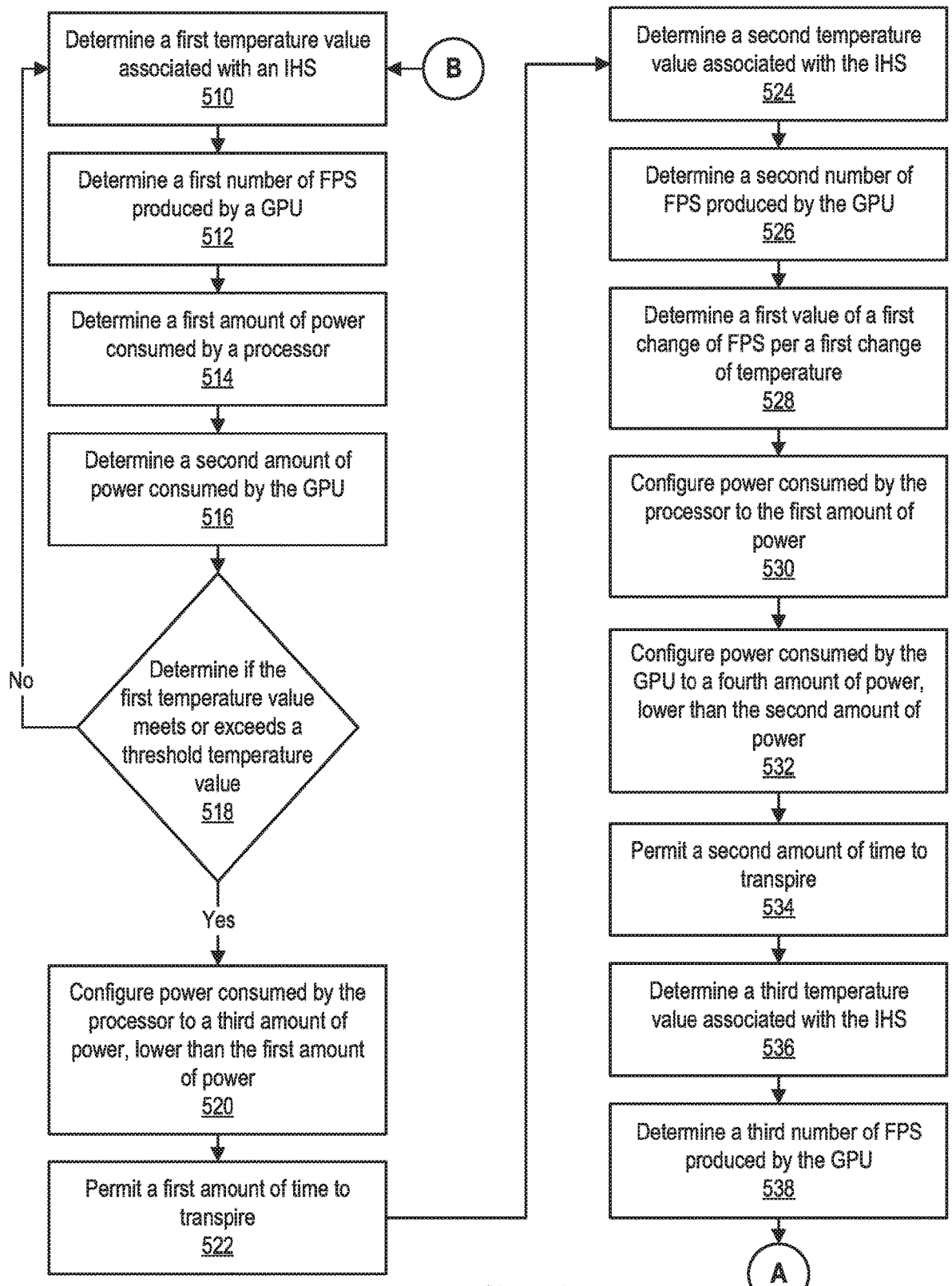
FIGS. 5A and 5B illustrate an example of a method of operating an information handling system, according to one or more embodiments.
Figure 5B:
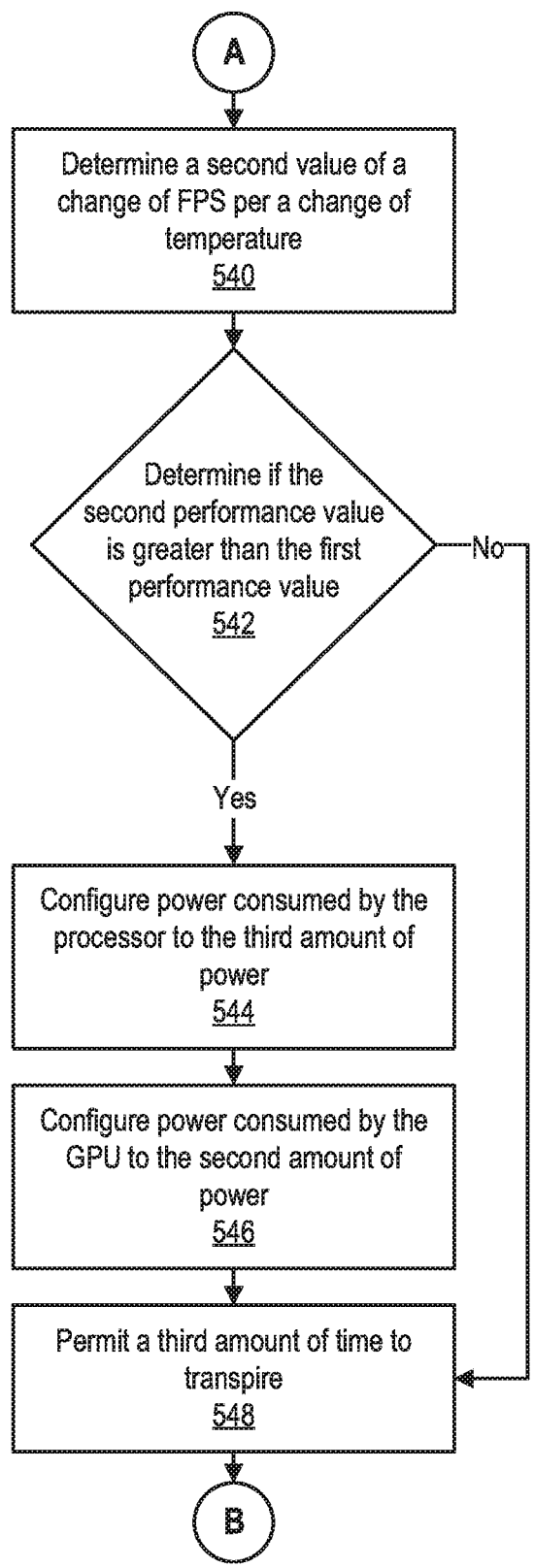

Turning now to FIGS. 5A and 5B, an example of a method of operating an information handling system is illustrated, according to one or more embodiments. At 510, a first temperature value associated with an information handling system may be determined. For example, EC 510 may determine a first temperature value associated with IHS 210. For instance, the first temperature value associated with IHS 210 may include a first temperature value associated with a portion of an outer surface of a housing of IHS 210. In one or more embodiments, the first temperature value associated with the portion of the outer surface of the housing of IHS 210 may be considered a first skin temperature.

At 512, a first number of FPS produced by a GPU may be determined. For example, EC 230 may determine a first number of FPS produced by GPU 240. In one or more embodiments, determining a number of FPS produced by GPU 240 may include querying GPU 240 for the number of FPS produced by GPU 240. In one example, GPU 240 may receive a request for the number of FPS produced by GPU 240. In another example, GPU 240 may provide the number of FPS produced by GPU 240. For instance, GPU 240 may provide the number of FPS produced by GPU 240 in response to receiving the request for the number of FPS produced by GPU 240. In one or more embodiments, a device driver may request the number of FPS produced by GPU 240 from GPU 240. For example, the device driver may be associated with OS 262. In one or more embodiments, the device driver and/or OS 262 may provide the number of FPS produced by GPU 240 to EC 230 via one or more of a management information exchange and IHSFW 272, among others. For example, EC 230 may receive the number of FPS produced by GPU 240 to EC 230 via one or more of a management information exchange and IHSFW 272, among others.

At 514, a first amount of power consumed by a processor may be determined. For example, EC 230 may determine a first amount of power consumed by processor 220. In one or more embodiments, determining the first amount of power consumed by processor 220 may include querying processor 220 for the first amount of power consumed by processor 220. For example, processor 220 may provide the first amount of power consumed by processor 220. For instance, EC 230 may receive the first amount of power consumed by processor 220 from processor 220.

At 516, a second amount of power consumed by the GPU may be determined. For example, EC 230 may determine a second amount of power consumed by GPU 240. In one or more embodiments, determining the second amount of power consumed by GPU 240 may include querying GPU 240 for the second amount of power consumed by GPU 240. For example, GPU 240 may provide the second amount of power consumed by GPU 240. For instance, EC 230 may receive the second amount of power consumed by GPU 240 from GPU 240.

At 518, it may be determined if the first temperature value meets or exceeds a threshold temperature value. For example, EC 230 may determine if the first temperature value meets or exceeds a threshold temperature value. In one or more embodiments, the threshold temperature value may be specified by a guideline or requirement. For example, the threshold temperature value may be associated with a keyboard. For instance, the threshold temperature value may be associated with a maximum temperature value that may be tolerable by a digit (e.g., a finger) of a user. As an example, the maximum temperature value that may be tolerable by the digit of the user may be forty-three degrees Celsius (43C). As another example, the maximum temperature value that may be tolerable by the digit of the user configurable by the user. In one instance, the user may be able to tolerate one or more higher temperatures. In another instance, the user may not utilize the keyboard (e.g., may not utilize the keyboard for a period of time) and may configure one or more higher maximum temperature values. In one or more embodiments, the threshold temperature value may be based at least on a material composition of a housing of the information handling system. In one example, the material composition of the housing of the information handling system may include plastic. In another example, the material composition of the housing of the information handling system may include metal.

At 520, power consumed by the processor may be configured to a third amount of power, lower than the first amount of power. For example, EC 230 may configure power consumed by processor 220 to a third amount of power, lower than the first amount of power. For instance, the third amount of power may be a number of Watts lower than the first amount of power. As an example, the third amount of power may be two Watts lower than the first amount of power. At 522, a first amount of time may be permitted to transpire. For example, EC 230 may permit a first amount of time to transpire. In one or more embodiments, the first amount of time may permit one or more values to change as one or more results of configuring power consumed by the processor to the third amount of power.

At 524, a second temperature value associated with the information handling system may be determined. For example, EC 230 may determine a second temperature value associated with IHS 210. For instance, the second temperature value associated with IHS 210 may include a second temperature value associated with the portion of the outer surface of the housing of IHS 210. In one or more embodiments, the second temperature value associated with the portion of the outer surface of the housing of IHS 210 may be considered a second skin temperature.

At 526, a second number of FPS produced by the GPU may be determined. For example, EC 230 may determine a second number of FPS produced by GPU 240. At 528, a first value of a first change of FPS per a first change of temperature may be determined. For example, EC 230 may determine a first value of a first change of FPS per a first change of temperature. In one or more embodiments, a first value of a first change of FPS per a first change of temperature may be based at least on a difference between the first number of FPS and the second number of FPS. For example, EC 230 may determine a difference between the first number of FPS and the second number of FPS. In one or more embodiments, the first value of the first change of FPS per the first change of temperature may be based at least on a difference between the first temperature value and the second temperature value. For example, EC 230 may determine a difference between the first temperature value and the second temperature value.

In one or more embodiments, the first value of the first change of FPS per the first change of temperature may be based at least on a quotient of the difference between the first number of FPS and the second number of FPS and the difference between the first temperature value and the second temperature value. For example, EC 230 may determine a quotient of the difference between the first number of FPS and the second number of FPS and the difference between the first temperature value and the second temperature value. In one or more embodiments, the first value of the first change of FPS per the first change of temperature may be considered to be a first performance value.

At 530, power consumed by the processor may be configured to the first amount of power. For example, EC 230 may configure power consumed by processor 220 to the first amount of power. At 532, power consumed by the GPU may be configured to a fourth amount of power, lower than the second amount of power. For example, EC 230 may configure power consumed by GPU 240 to a fourth amount of power, lower than the second amount of power. For instance, the fourth amount of power may be a number of Watts lower than the second amount of power. As an example, the fourth amount of power may be two Watts lower than the second amount of power. In one or more embodiments, the fourth amount of power may be determined based at least on the first performance value.

At 534, a second amount of time may be permitted to transpire. For example, EC 230 may permit a second amount of time to transpire. In one or more embodiments, the second amount of time may permit one or more values to change as one or more results of configuring power consumed by the GPU to the fourth amount of power.

At 536, a third temperature value associated with the information handling system may be determined. For example, EC 230 may determine a third temperature value associated with IHS 210. For instance, the third temperature value associated with IHS 210 may include a third temperature value associated with the portion of the outer surface of the housing of IHS 210. In one or more embodiments, the third temperature value associated with the portion of the outer surface of the housing of IHS 210 may be considered a third skin temperature.

At 538, a third number of FPS produced by the GPU may be determined. For example, EC 230 may determine a third number of FPS produced by GPU 240. At 540, a second value of a change of FPS per a change of temperature may be determined. For example, EC 230 may determine a second value of a change of FPS per a change of temperature. In one or more embodiments, a second value of a second change of FPS per a second change of temperature may be based at least on a difference between the second number of FPS and the third number of FPS. For example, EC 230 may determine a difference between the second number of FPS and the third number of FPS. In one or more embodiments, the second value of the first change of FPS per the second change of temperature may be based at least on a difference between the second temperature value and the third temperature value. For example, EC 230 may determine a difference between the second temperature value and the third temperature value.

In one or more embodiments, the second value of the first change of FPS per the second change of temperature may be based at least on a quotient of the difference between the second number of FPS and the third number of FPS and the difference between the second temperature value and the third temperature value. For example, EC 230 may determine a quotient of the difference between the second number of FPS and the third number of FPS and the difference between the second temperature value and the third temperature value. In one or more embodiments, the second value of the first change of FPS per the second change of temperature may be considered to be a second performance value.

At 542, it may be determined if the second performance value is greater than the first performance value. For example, EC 230 may determine if the second performance value is greater than the first performance value. If the second performance value is greater than the first performance value, power consumed by the processor may be configured to the third amount of power, at 544. For example, EC 230 may configure power consumed by processor 220 to the third amount of power. At 546, power consumed by the GPU may be configured to the second amount of power. For example, EC 230 may configure power consumed by GPU 240 to the second amount of power. If the second performance value is not greater than the first performance value, a third amount of time may be permitted to transpire, at 548. For example, EC 230 may permit a third amount of time to transpire. In one or more embodiments, the method may proceed to 510.

Figure 6A:
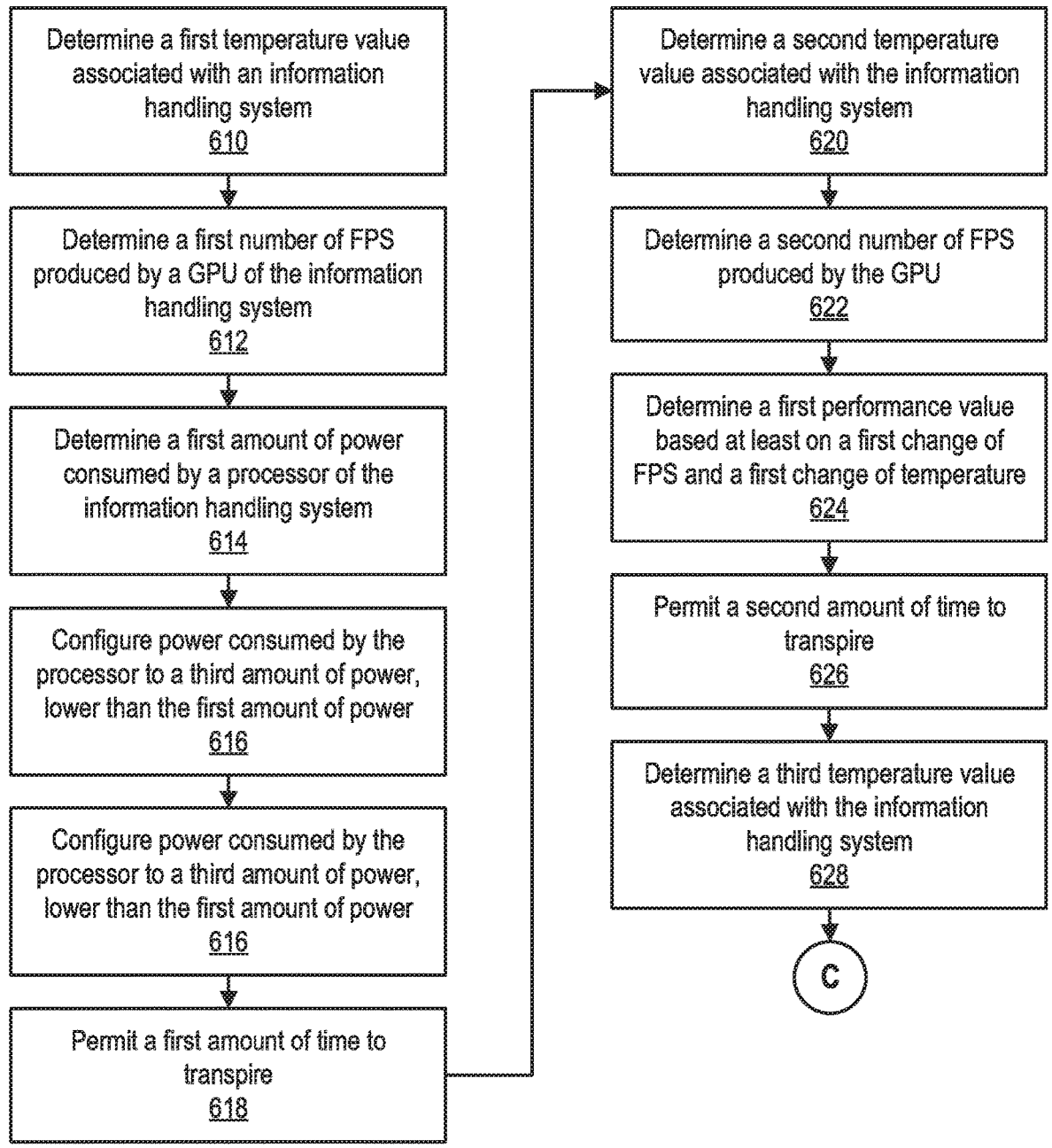
FIGS. 6A and 6B illustrate a second example of a method of a method of operating an information handling system, according to one or more embodiments.
Figure 6B:
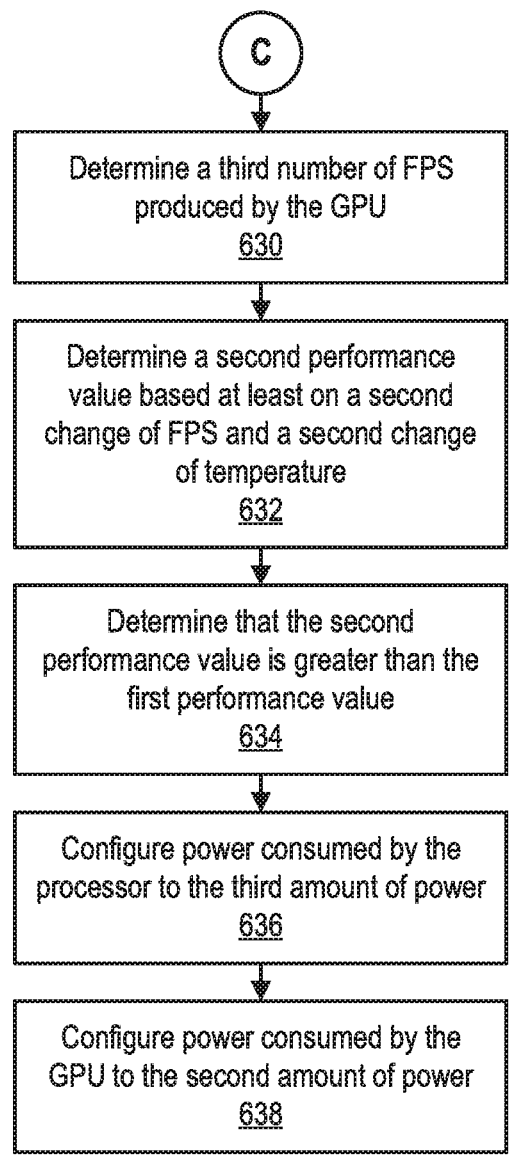

Turning now to FIGS. 6A and 6B, a second example of a method of operating an information handling system is illustrated, according to one or more embodiments. At 610, a first temperature value associated with an information handling system may be determined. For example, EC 230 may determine a first temperature value associated with IHS 210. For instance, the first temperature value associated with the information handling system may include a first skin temperature value of IHS 210. In one or more embodiments, a skin temperature value of the information handling system may include a temperature value associated with a portion of an outer surface of a housing of the information handling system. In one example, the outer surface of the housing may include a case that houses the information handling system. In one instance, the case may include a material that includes metal. In another instance, the case may include a material that includes plastic. In another example, the outer surface of the housing may include a keyboard. For instance, the keyboard may form a portion of the housing.

At 612, a first number of FPS produced by a GPU of the information handling system may be determined. For example, EC 230 may determine a first number of FPS produced by GPU 240. In one or more embodiments, before determining the first number of FPS, it may be determined that the first temperature value associated with the information handling system meets or exceeds a threshold temperature value. For example, determining the first number of FPS may be performed in response to determining that the first temperature value associated with the information handling system meets or exceeds the threshold temperature value. For instance, the threshold temperature value may include a threshold skin temperature value of IHS 210. In one or more embodiments, EC 230 may determine that the first temperature value associated with the information handling system meets or exceeds a threshold temperature value.

At 614, a first amount of power consumed by a processor of the information handling system may be determined. For example, EC 230 may determine a first amount of power consumed by processor 220. At 616, power consumed by the processor may be configured to a third amount of power, lower than the first amount of power. For example, EC 230 may configure power consumed by processor 220 to a third amount of power, lower than the first amount of power. At 618, a first amount of time may be permitted to transpire. For example, EC 230 may permit a first amount of time to transpire. At 620, a second temperature value associated with the information handling system may be determined. For example, EC 230 may determine a second temperature value associated with IHS 210. For instance, the second temperature value associated with the information handling system may include a second skin temperature of IHS 210.

At 622, a second number of FPS produced by the GPU may be determined. For example, EC 230 may determine a second number of FPS produced by GPU 240. At 624, a first performance value based at least on a first change of FPS and a first change of temperature may be determined. For example, EC 230 may determine a first performance value based at least on a first change of FPS and a first change of temperature. In one instance, the first change of temperature may include a difference between the first temperature value and the second temperature value. In another instance, the first change of FPS may include a difference between the first number of FPS and the second number of FPS. In one or more embodiments, the first performance value may include a first quotient of the first change of FPS and the first change of temperature (e.g., the first change of FPS divided by the first change of temperature).

At 626, a second amount of time to transpire may be permitted to transpire. For example, EC 230 may permit a second amount of time to transpire. At 628, a third temperature value associated with the information handling system. For example, EC 230 may determine a third temperature value associated with IHS 210. For instance, the third temperature value associated with IHS 210 may include a third skin temperature of IHS 210. At 630, a third number of FPS produced by the GPU may be determined. For example, EC 230 may determine a third number of FPS produced by GPU 240.

At 632, a second performance value based at least on a second change of FPS and a second change of temperature may be determined. For example, EC 230 may determine a second performance value based at least on a second change of FPS and a second change of temperature. In one instance, the second change of temperature may include a difference between the second temperature value and the third temperature value. In another instance, the second change of FPS may include a difference between the second number of FPS and the third number of FPS. In one or more embodiments, the second performance value may include a second quotient of the second change of FPS and the second change of temperature (e.g., the second change of FPS divided by the second change of temperature).

At 634, it may be determined that the second performance value is greater than the first performance value. For example, EC 230 may determine that the second performance value is greater than the first performance value. At 636, power consumed by the processor may be configured to the third amount of power. For example, EC 230 may configure power consumed by processor 220 to the third amount of power. At 638, power consumed by the GPU may be configured to the second amount of power. For example, EC 230 may configure power consumed by GPU 240 to the second amount of power. In one or more embodiments, configuring power consumed by the processor to the third amount of power and configuring power consumed by the GPU to the second amount of power may be performed in response to determining that the second performance value is greater than the first performance value.

Figure 7A:
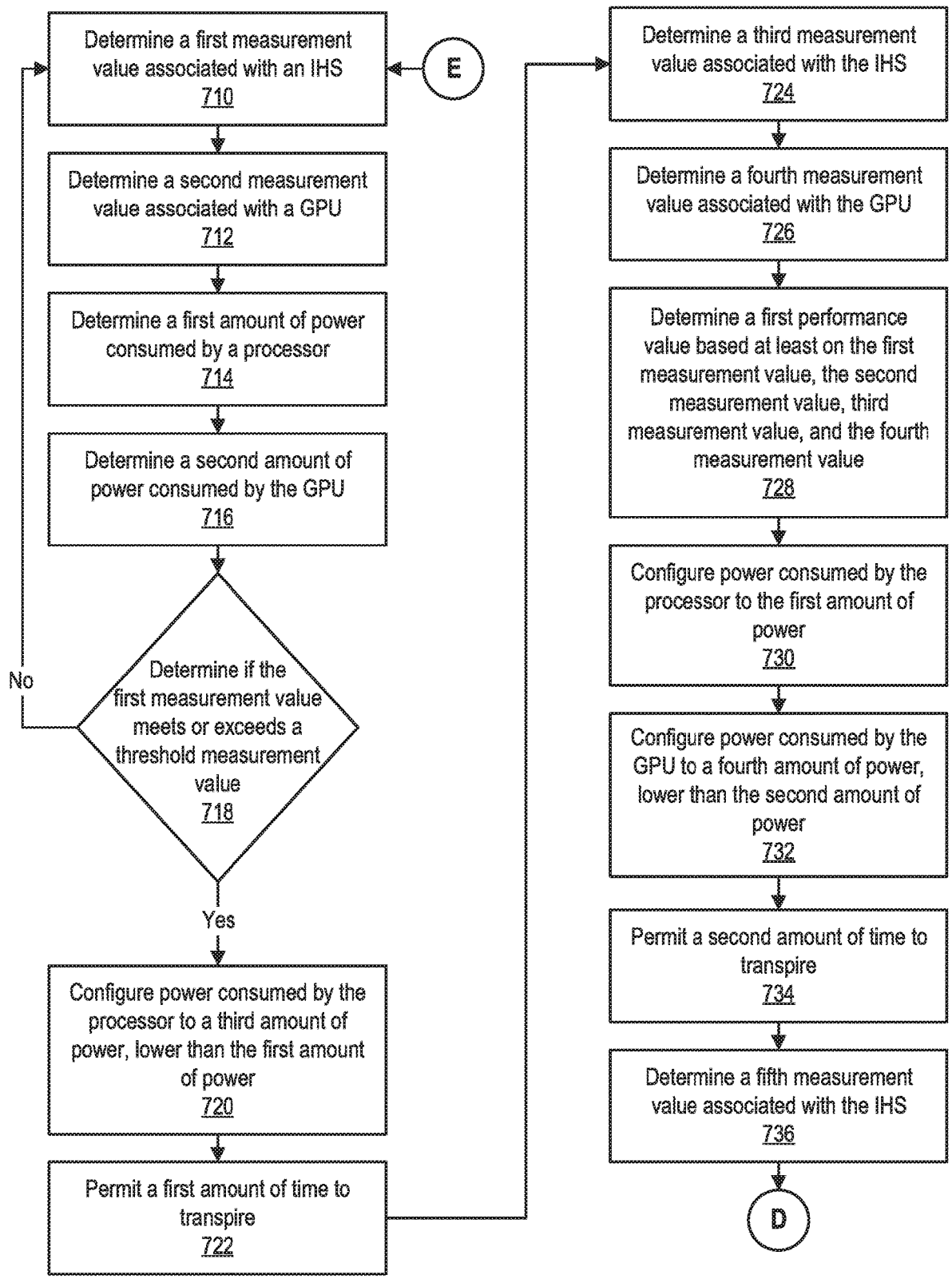
FIGS. 7A and 7B illustrate another example of a method of operating an information handling system, according to one or more embodiments.
Figure 7B:
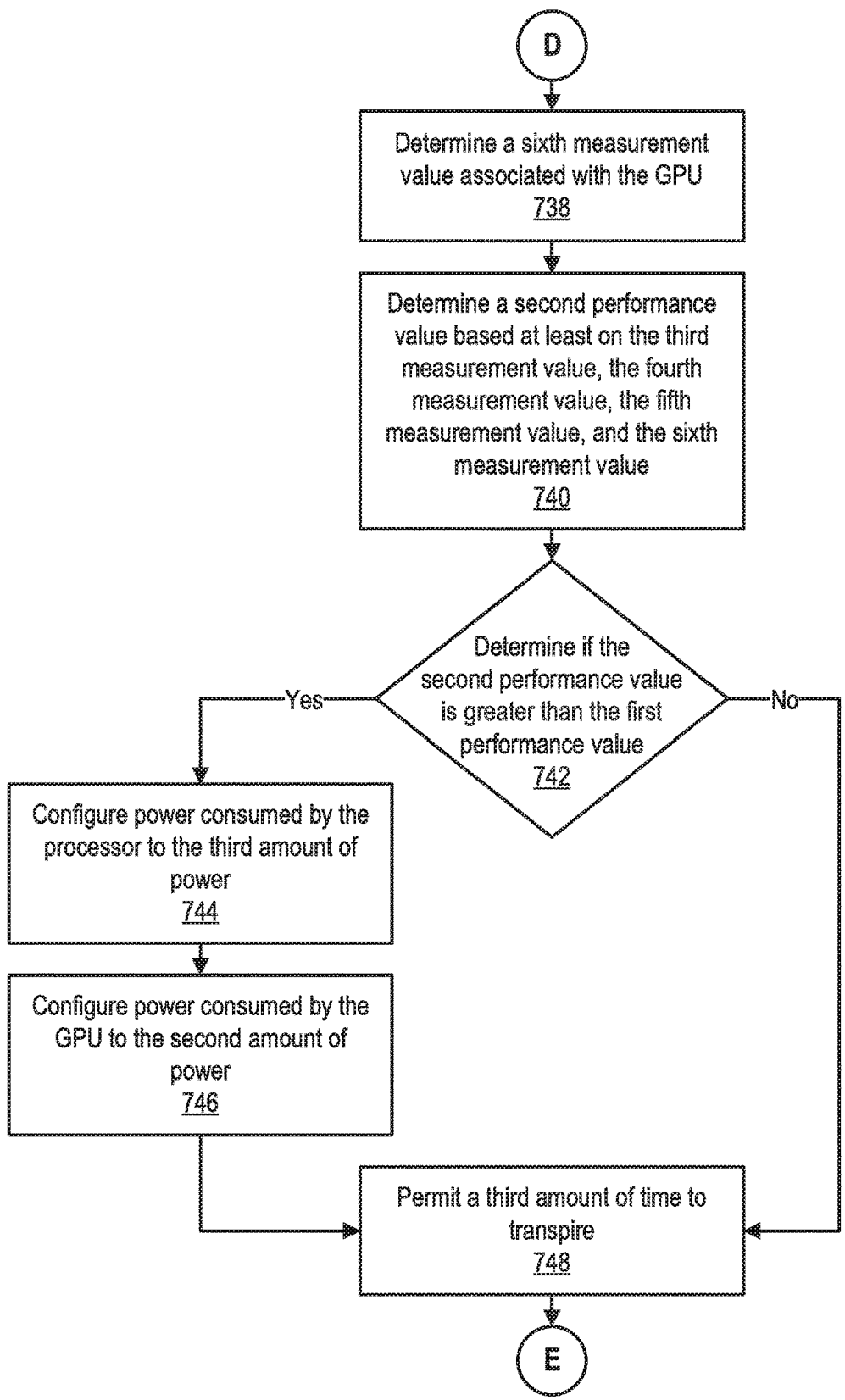

Turning now to FIGS. 7A and 7B, another example of a method of operating an information handling system is illustrated, according to one or more embodiments. At 710, a first measurement value associated with an information handling system may be determined. For example, EC 710 may determine a first measurement value associated with IHS 210. As an example, the first measurement value associated with IHS 210 may include a first temperature value associated with a portion of an outer surface of a housing of IHS 210. For instance, the first temperature value associated with the portion of the outer surface of the housing of IHS 210 may be considered a first skin temperature. As a second example, the first measurement value associated with IHS 210 may include a first temperature value associated with a portion within a housing of IHS 210. As another example, the first measurement value associated with IHS 210 may include a first clock speed of processor 220.

At 712, a second measurement value associated with a GPU may be determined. For example, EC 230 may determine a second measurement value associated with GPU 240. For instance, a measurement value associated with GPU 240 may include a resolution (e.g., a number of pixel columns and a number of pixel rows in a displayed image), a refresh rate (e.g., a number of times a display updates per second), an aspect ratio, or a latency value, among others. In one or more embodiments, determining a measurement value associated with GPU 240 may include querying GPU 240 for the measurement value associated with GPU 240. In one example, GPU 240 may receive a request for the measurement value associated with GPU 240. In another example, GPU 240 may provide the measurement value associated with GPU 240. For instance, GPU 240 may provide the measurement value associated with GPU 240 in response to receiving the request for the measurement value associated with GPU 240. In one or more embodiments, a device driver may request the measurement value associated with GPU 240 from GPU 240. For example, the device driver may be associated with OS 262. In one or more embodiments, the device driver and/or OS 262 may provide the measurement value associated with GPU 240 to EC 230 via one or more of a management information exchange and IHSFW 272, among others. For example, EC 230 may receive the measurement value associated with GPU 240 to EC 230 via one or more of a management information exchange and IHSFW 272, among others.

At 714, a first amount of power consumed by a processor may be determined. For example, EC 230 may determine a first amount of power consumed by processor 220. In one or more embodiments, determining the first amount of power consumed by processor 220 may include querying processor 220 for the first amount of power consumed by processor 220. For example, processor 220 may provide the first amount of power consumed by processor 220. For instance, EC 230 may receive the first amount of power consumed by processor 220 from processor 220.

At 716, a second amount of power consumed by the GPU may be determined. For example, EC 230 may determine a second amount of power consumed by GPU 240. In one or more embodiments, determining the second amount of power consumed by GPU 240 may include querying GPU 240 for the second amount of power consumed by GPU 240. For example, GPU 240 may provide the second amount of power consumed by GPU 240. For instance, EC 230 may receive the second amount of power consumed by GPU 240 from GPU 240.

At 718, it may be determined if the first measurement value meets or exceeds a threshold measurement value. For example, EC 230 may determine if the first measurement value meets or exceeds a threshold measurement value. As one example, the threshold measurement value may be specified by a guideline or requirement. As another example, a user may configure the threshold measurement value.

At 720, power consumed by the processor may be configured to a third amount of power, lower than the first amount of power. For example, EC 230 may configure power consumed by processor 220 to a third amount of power, lower than the first amount of power. For instance, the third amount of power may be a number of Watts lower than the first amount of power. As an example, the third amount of power may be two Watts lower than the first amount of power. At 722, a first amount of time may be permitted to transpire. For example, EC 230 may permit a first amount of time to transpire. In one or more embodiments, the first amount of time may permit one or more values to change as one or more results of configuring power consumed by the processor to the third amount of power.

At 724, a third measurement value associated with the information handling system may be determined. For example, EC 230 may determine a third measurement value associated with IHS 210. As an example, the third measurement value associated with IHS 210 may include a second temperature value associated with the portion of the outer surface of the housing of IHS 210. For instance, the second temperature value associated with the portion of the outer surface of the housing of IHS 210 may be considered a second skin temperature. As another example, the third measurement value associated with IHS 210 may include a second temperature value associated within the housing of IHS 210.

At 726, a fourth measurement value associated with the GPU may be determined. For example, EC 230 may determine a fourth measurement value associated with GPU 240. At 728, a first performance value based at least on the first measurement value, the second measurement value, the third measurement value, and the fourth measurement value may be determined. For example, EC 230 may determine a first performance value based at least on the first measurement value, the second measurement value, the third measurement value, and the fourth measurement value. In one or more embodiments, determining the first performance value may include determining a difference between the first measurement value and the third measurement value. In one or more embodiments, determining the first performance value may include determining a difference between the second measurement value and the fourth measurement value. In one or more embodiments, determining the first performance value may include determining a ratio or a quotient between the difference between the first measurement value and the third measurement value and the difference between the second measurement value and the fourth measurement value.

At 730, power consumed by the processor may be configured to the first amount of power. For example, EC 230 may configure power consumed by processor 220 to the first amount of power. At 732, power consumed by the GPU may be configured to a fourth amount of power, lower than the second amount of power. For example, EC 230 may configure power consumed by GPU 240 to a fourth amount of power, lower than the second amount of power. For instance, the fourth amount of power may be a number of Watts lower than the second amount of power. As an example, the fourth amount of power may be two Watts lower than the second amount of power. In one or more embodiments, the fourth amount of power may be determined based at least on the first performance value.

At 734, a second amount of time may be permitted to transpire. For example, EC 230 may permit a second amount of time to transpire. In one or more embodiments, the second amount of time may permit one or more values to change as one or more results of configuring power consumed by the GPU to the fourth amount of power.

At 736, a fifth measurement value associated with the information handling system may be determined. For example, EC 230 may determine a fifth measurement value associated with IHS 210. As one example, the fifth measurement value associated with IHS 210 may include a third temperature value associated with the portion of the outer surface of the housing of IHS 210. For instance, the third temperature value associated with the portion of the outer surface of the housing of IHS 210 may be considered a third skin temperature. As another second example, the fifth measurement value associated with IHS 210 may include a third temperature value within the housing of IHS 210.

At 738, a sixth measurement value associated with the GPU may be determined. For example, EC 230 may determine a sixth measurement value associated with GPU 240. At 740, a second performance value based at least on the third measurement value, the fourth measurement value, the fifth measurement value, and the sixth measurement value may be determined. For example, EC 230 may determine a second performance value based at least on the third measurement value, the fourth measurement value, the fifth measurement value, and the sixth measurement value. In one or more embodiments, determining the second performance value may include determining a difference between the third measurement value and the fifth measurement value. In one or more embodiments, determining the second performance value may include determining a difference between the fourth measurement value and the sixth measurement value. In one or more embodiments, determining the second performance value may include determining a ratio or a quotient between the difference between the third measurement value and the fifth measurement value and the difference between the fourth measurement value and the sixth measurement value.

At 742, it may be determined if the second performance value is greater than the first performance value. For example, EC 230 may determine if the second performance value is greater than the first performance value. If the second performance value is greater than the first performance value, power consumed by the processor may be configured to the third amount of power, at 744. For example, EC 230 may configure power consumed by processor 220 to the third amount of power. At 746, power consumed by the GPU may be configured to the second amount of power. For example, EC 230 may configure power consumed by GPU 240 to the second amount of power. If the second performance value is not greater than the first performance value, a third amount of time may be permitted to transpire, at 748. For example, EC 230 may permit a third amount of time to transpire. In one or more embodiments, the method may proceed to 710.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
a processor;
a graphics processing unit (GPU); and
a memory medium, coupled to the processor, that stores instructions executable by the processor, which when executed by the processor, cause the information handling system to:
determine a first temperature value associated with the information handling system;
determine a first number of frames per second (FPS) produced by the GPU;
determine a first amount of power consumed by the processor;
determine a second amount of power consumed by the GPU;
Configure power consumed by the processor to a third amount of power, lower than the first amount of power;
permit a first amount of time to transpire;
determine a second temperature value associated with the information handling system;
determine a second number of FPS produced by the GPU;
determine a first performance value based at least on a first change of FPS and a first change of temperature;
configure power consumed by the processor to the first amount of power;
configure power consumed by the GPU to a fourth amount of power, lower than the second amount of power;
permit a second amount of time to transpire;
determine a third temperature value associated with the information handling system;
determine a third number of FPS produced by the GPU;
determine a second performance value based at least on a second change of FPS and a second change of temperature;
determine that the second performance value is greater than the first performance value;
configure power consumed by the processor to the third amount of power; and
configure power consumed by the GPU to the second amount of power.

2. The information handling system of claim 1, further comprising:
a semiconductor package that includes the processor and the GPU.

3. The information handling system of claim 1,
wherein the first change of temperature includes a difference between the first temperature value and the second temperature value;
wherein the second change of temperature includes a difference between the second temperature value and the third temperature value;
wherein the first change of FPS includes a difference between the first number of FPS and the second number of FPS; and
wherein the second change of FPS includes a difference between the second number of FPS and the third number of FPS.

4. The information handling system of claim 3,
wherein the first performance value includes a first quotient of the first change of FPS and the first change of temperature; and
wherein the second performance value includes a second quotient of the first change of FPS and the second change of temperature.

5. The information handling system of claim 1, further comprising:
a housing;
wherein the first temperature value associated with the information handling system includes a first temperature value associated with an outer surface of the housing;
wherein the second temperature value associated with the information handling system includes a second temperature value associated with the outer surface of the housing; and
wherein the third temperature value associated with the information handling system includes a third temperature value associated with the outer surface of the housing.

6. The information handling system of claim 1,
wherein the instructions further cause the information handling system to:
before determining the first number of FPS, determine that the first temperature value associated with the information handling system meets or exceeds a threshold temperature value; and
wherein determining the first number of FPS is performed in response to determining that the first temperature value associated with the information handling system meets or exceeds the threshold temperature value.

7. The information handling system of claim 6, further comprising:
a housing;
wherein the first temperature value associated with the information handling system includes a first temperature value associated with a portion of an outer surface of the housing.

8. A method, comprising:
determining a first temperature value associated with an information handling system;
determining a first number of frames per second (FPS) produced by a graphics processing unit (GPU) of the information handling system;
determining a first amount of power consumed by a processor of the information handling system;

determining a second amount of power consumed by the GPU;
configuring power consumed by the processor to a third amount of power, lower than the first amount of power;
permitting a first amount of time to transpire;
determining a second temperature value associated with the information handling system;
determining a second number of FPS produced by the GPU;
determining a first performance value based at least on a first change of FPS and a first change of temperature;
configuring power consumed by the processor to the first amount of power;
configuring power consumed by the GPU to a fourth amount of power, lower than the second amount of power;
permitting a second amount of time to transpire;
determining a third temperature value associated with the information handling system;
determining a third number of FPS produced by the GPU;
determining a second performance value based at least on a second change of FPS and a second change of temperature;
determining that the second performance value is greater than the first performance value;
configuring power consumed by the processor to the third amount of power; and
configuring power consumed by the GPU to the second amount of power.

9. The method of claim 8, wherein a semiconductor package of the information handling system includes the processor and the GPU.

10. The method of claim 8,
wherein the first change of temperature includes a difference between the first temperature value and the second temperature value;
wherein the second change of temperature includes a difference between the second temperature value and the third temperature value;
wherein the first change of FPS includes a difference between the first number of FPS and the second number of FPS; and
wherein the second change of FPS includes a difference between the second number of FPS and the third number of FPS.

11. The method of claim 10,
wherein the first performance value includes a first quotient of the first change of FPS and the first change of temperature; and
wherein the second performance value includes a second quotient of the first change of FPS and the second change of temperature.

12. The method of claim 8,
wherein the first temperature value associated with the information handling system includes a first temperature value associated with an outer surface of a housing of the information handling system;
wherein the second temperature value associated with the information handling system includes a second temperature value associated with the outer surface of the housing of the information handling system; and
wherein the third temperature value associated with the information handling system includes a third temperature value associated with the outer surface of the housing of the information handling system.

13. The method of claim 8, further comprising:
before the determining the first number of FPS, determining that the first temperature value associated with the information handling system meets or exceeds a threshold temperature value;
wherein the determining the first number of FPS is performed in response to the determining that the first temperature value associated with the information handling system meets or exceeds the threshold temperature value.

14. The method of claim 13, wherein the first temperature value associated with the information handling system includes a first temperature value associated with a portion of an outer surface of a housing of the information handling system.

15. A computer-readable non-transitory memory medium that includes instructions that, when executed by a processor of an information handling system, cause the information handling system to:
determine a first temperature value associated with the information handling system;
determine a first number of frames per second (FPS) produced by a graphics processing unit (GPU) of the information handling system;
determine a first amount of power consumed by the processor;
determine a second amount of power consumed by the GPU;
configure power consumed by the processor to a third amount of power, lower than the first amount of power;
permit a first amount of time to transpire;
determine a second temperature value associated with the information handling system;
determine a second number of FPS produced by the GPU;
determine a first performance value based at least on a first change of FPS and a first change of temperature;
configure power consumed by the processor to the first amount of power;
configure power consumed by the GPU to a fourth amount of power, lower than the second amount of power;
permit a second amount of time to transpire;
determine a third temperature value associated with the information handling system;
determine a third number of FPS produced by the GPU;
determine a second performance value based at least on a second change of FPS and a second change of temperature;
determine that the second performance value is greater than the first performance value;
configure power consumed by the processor to the third amount of power; and
configure power consumed by the GPU to the second amount of power.

16. The computer-readable non-transitory memory medium of claim 15, wherein a semiconductor package of the information handling system includes the processor and the GPU.

17. The computer-readable non-transitory memory medium of claim 15,
wherein the first change of temperature includes a difference between the first temperature value and the second temperature value;
wherein the second change of temperature includes a difference between the second temperature value and the third temperature value;

wherein the first change of FPS includes a difference between the first number of FPS and the second number of FPS; and wherein the second change of FPS includes a difference between the second number of FPS and the third number of FPS.

18. The computer-readable non-transitory memory medium of claim 17, wherein the first performance value includes a first quotient of the first change of FPS and the first change of temperature; and wherein the second performance value includes a second quotient of the first change of FPS and the second change of temperature.

19. The computer-readable non-transitory memory medium of claim 15, wherein the first temperature value associated with the information handling system includes a first temperature value associated with an outer surface of a housing of the information handling system;

wherein the second temperature value associated with the information handling system includes a second temperature value associated with the outer surface of the housing of the information handling system; and wherein the third temperature value associated with the information handling system includes a third temperature value associated with the outer surface of the housing of the information handling system.

20. The computer-readable non-transitory memory medium of claim 15, wherein the instructions further cause the information handling system to:

before determining the first number of FPS, determine that the first temperature value associated with the information handling system meets or exceeds a threshold temperature value;

wherein determining the first number of FPS is performed in response to determining that the first temperature value associated with the information handling system meets or exceeds the threshold temperature value; and wherein the first temperature value associated with the information handling system includes a first temperature value associated with a portion of an outer surface of a housing of the information handling system.

\* \* \* \* \*